United States Patent
Langmesser et al.

(10) Patent No.: US 8,220,778 B2
(45) Date of Patent: Jul. 17, 2012

(54) VALVE ASSEMBLY HAVING A UNITARY VALVE SLEEVE

(75) Inventors: Nicholas Langmesser, Reno, NV (US); Johnny Ellis, Reno, NV (US); Kristopher M. Weide, Gladstone, MI (US)

(73) Assignee: Tyco Valves & Controls, LP, Houston, TX (US)

( * ) Notice: Subject to any disclaimer, the term of this patent is extended or adjusted under 35 U.S.C. 154(b) by 484 days.

(21) Appl. No.: 12/332,682

(22) Filed: Dec. 11, 2008

(65) Prior Publication Data
US 2010/0264350 A1    Oct. 21, 2010

Related U.S. Application Data

(63) Continuation-in-part of application No. 11/740,348, filed on Apr. 26, 2007, now Pat. No. 8,016,265.

(60) Provisional application No. 60/795,000, filed on Apr. 26, 2006.

(51) Int. Cl.
*F16K 3/02* (2006.01)
(52) U.S. Cl. .................. 251/328; 251/358; 277/574
(58) Field of Classification Search .......... 251/326–329, 251/358; 277/572–575
See application file for complete search history.

(56) References Cited

U.S. PATENT DOCUMENTS

| | | | | |
|---|---|---|---|---|
| 3,333,816 | A | * | 8/1967 | Williams et al. ............... 251/327 |
| 4,257,447 | A | * | 3/1981 | Clarkson ........................ 137/375 |
| 5,137,261 | A | | 8/1992 | Clifford |
| 5,150,881 | A | | 9/1992 | McKavanagh |
| 5,271,426 | A | * | 12/1993 | Clarkson et al. ............... 137/375 |
| 5,338,006 | A | * | 8/1994 | McCutcheon et al. ......... 251/327 |
| 5,370,149 | A | | 12/1994 | Clarkson et al. |
| 5,560,587 | A | | 10/1996 | McCutcheon et al. |
| 5,582,200 | A | | 12/1996 | Kimpel et al. |
| 5,890,700 | A | * | 4/1999 | Clarkson et al. ............... 251/327 |
| 7,309,057 | B2 | | 12/2007 | Santiago |
| 2005/0001195 | A1 | * | 1/2005 | Blease et al. ................... 251/171 |
| 2005/0145818 | A1 | * | 7/2005 | Santiago ........................ 251/327 |

FOREIGN PATENT DOCUMENTS

WO       WO 03060360 A2 *   7/2003

* cited by examiner

*Primary Examiner* — John Bastianelli

(57) ABSTRACT

A valve assembly preferably including a housing having a recess and a flange face and a valve sleeve disposed within the recess. The sleeve preferably includes an annulus having an outer surface and an inner surface that defines a passageway about a central axis, the outer and inner surfaces being radially spaced from one another to define a wall. The wall has a first end portion and a second end portion axially spaced from the first end portion, and homogenous material properties from the first end portion to the second end portion. Preferably, the first end portion defines a lip for supporting the annulus in the recess and further defines a first chamber that encases at least a portion of a first support member. The second end portion preferably defines a flange portion along the outer surface for engaging the flange and further defines a second chamber that encases at least a portion of a second support member.

18 Claims, 14 Drawing Sheets

VALVE ASSEMBLY HAVING A UNITARY VALVE SLEEVE

BACKGROUND OF THE INVENTION

The present invention relates generally to the field of flow control valves and the construction thereof. More specifically, the present invention relates to the internal components of flow control valves including the elastomer sleeve that provides a sealing surface for the valve components and connections.

Flow control valves such as, for example, knife gate valves or line blind valves, are used to control the flow of fluids and can be particularly well suited for use with abrasive and corrosive slurries such as are encountered in, for example, the mining, pulp or paper industries. One form of gate valve known in the art includes a housing constructed of two halves that when coupled together form the valve housing and passageway therethrough. On opposite sides of the housing are connections for installing the valve in a pipe line, for example, the housing can be bolted to a flange end of a pipe. To control the flow of fluid through the valve, the valve includes a gate that, in operation, translates or travels between the two valve halves. Each valve half defines a sleeve recess in which is disposed a valve sleeve. The valve sleeves are axially aligned to define the passageway and provide a sealing function in the valve. To seat the valve sleeves in the recesses, the sleeves can be configured with ridges or lips to conform to the contours of the sleeve recess. The two valve sleeves seal against one another when the gate is in the open configuration to allow for fluid flow through the valve while substantially preventing fluid leakage from the valve housing. When the gate is in the closed position, the opposing sleeves seal against the gate and substantially prevent the fluid that collects against the gate from leaking from the housing. One exemplary valve housing and sleeve assembly includes the CLARKSON KGD WAFER STYLE SLURRY KNIFE GATE VALVE from TYCO FLOW CONTROL as shown in the TYCO FLOW CONTROL data sheet entitled "Clarkson KGD Wafer Style Slurry Knife Gate Valve 2" thru 24" (2005). Other known valves and valve sleeves are shown and described in, for example, U.S. Pat. Nos. 4,895,181 and 5,730,149.

Valve sleeves not only create a sealing surface between the valve gate and one another, but the valve sleeves also provide a support surface to engage the flange surfaces of the valve housing or other piping elements coupled to the valve housing. Known valve sleeves use a two-piece construction in which the sleeve has a seat portion that is disposed within the sleeve recess of the valve housing and a separate support disc which snaps to the seat portion to form a flange for engagement with the flange face of the housing. The separate support disc is generally sized to the pipe to which the valve housing is coupled. In addition, the support disc is generally made of a harder plastic or other hard material to provide a surface against which the adjoining pipe may rub. Moreover, the material forming the support disc is dissimilar to the material of the seat portion of the sleeve.

Because the support disc is made of a hard material, its ability to provide a tight seal between flange surfaces, in some operative conditions, may be limited. Moreover, because the support discs are constructed from a material different than the valve seat portion, the flange and its support disc may not be as chemically resistant as the seat portion. Accordingly, the flange and its support disc may be susceptible to long term fatigue, such as cracking or breaking In addition, due to the inelasticity of the hardened support disc, the support disc may not withstand or be resilient to over-compression by the flange bolts coupling the valve into the piping assembly. Alternative known sleeve designs include an integrated support disc portion. However, these alternative designs do not effectively address the issue of over-compression at the flange bolts.

SUMMARY OF THE INVENTION

A preferred embodiment of a valve sleeve for sealing a valve having a recess and a flange includes a support ring disposed about a first axis, an annular support plate disposed about a second axis, and an annulus disposed about a third axis and having a one-piece wall continuously radially disposed about the third axis to define a passageway therethrough. The wall preferably includes a seat portion defining a first end face of the annulus and has a lip along the wall for supporting the annulus in the recess of the valve. The support ring is preferably encased in the seat portion such that the support ring is coaxial with the annulus so as to radially support the seat portion. The seat portion further preferably defines a first radius relative to the third axis. The wall further includes a flange portion defining a second end face of the annulus and has a second radius relative to the third axis greater than the first radius to engage the flange of the valve. The annular support plate is preferably encased in the flange portion such that the support plate is coaxial with the annulus so as to axially support the flange portion.

The flange portion further preferably defines at least one chamber disposed radially from the third axis having an opening disposed along the second end face. In a preferred embodiment, the chamber extends axially from the flange portion into the seat portion. In another preferred embodiment, the flange portion has a first portion and a second portion radially disposed about the first portion, the first portion defining a first thickness to encase the annular support plate and a second portion defining a second thickness to form a gasket for sealing the flange of the valve.

The flange portion is preferably formed with the seat portion such that the annulus has homogenous material properties from the first end face to the second end face. More preferably the valve sleeve has a unitary construction and can further be formed from an elastomeric material.

In another preferred embodiment of the valve sleeve, the sleeve includes a wall having a first end portion and a second end portion axially spaced from the first end portion, the wall having homogenous material properties from the first end portion to the second end portion. The wall preferably includes a first portion defining a first chamber that encases at least a portion of a first support member and a second portion defining a second chamber that encases at least a portion of a second support member. The wall further preferably defines a third chamber extending axially from the second portion to the first portion. Preferably, the first and second chambers intersect at least a portion of the third chamber. In another preferred embodiment, the sleeve further includes a pin plug disposed in the chamber.

A preferred embodiment of a valve assembly includes a housing having a recess and a flange face and a valve sleeve disposed within the recess. The sleeve preferably includes an annulus having an outer surface and an inner surface that defines a passageway about a central axis, the outer and inner surfaces being radially spaced from one another to define a wall. The wall has a first end portion and a second end portion axially spaced from the first end portion, and homogenous material properties from the first end portion to the second end portion. Preferably, the first end portion defines a lip for supporting the annulus in the recess and further defines a first chamber that encases at least a portion of a first support member. The second end portion preferably defines a flange portion along the outer surface for engaging the flange and further defines a second chamber that encases at least a portion of a second support member.

Another preferred embodiment provides a method of forming a valve sleeve. The method can be achieved by disposing a first substrate about a member in a mold chamber, disposing a second substrate axially spaced from the first substrate and about the member, and encapsulating at least a portion of the first substrate and at least a portion of the second substrate within an elastomeric material so as to form a body of unitary construction. Preferably, disposing the first substrate about the member includes disposing an annular plate about the member, the plate extending radially relative to the central axis. Moreover, introducing the elastomeric material preferably includes injection molding of the material.

BRIEF DESCRIPTION OF THE DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments examples of the invention as recited in the appended claims.

DETAILED DESCRIPTION

Figure 1:
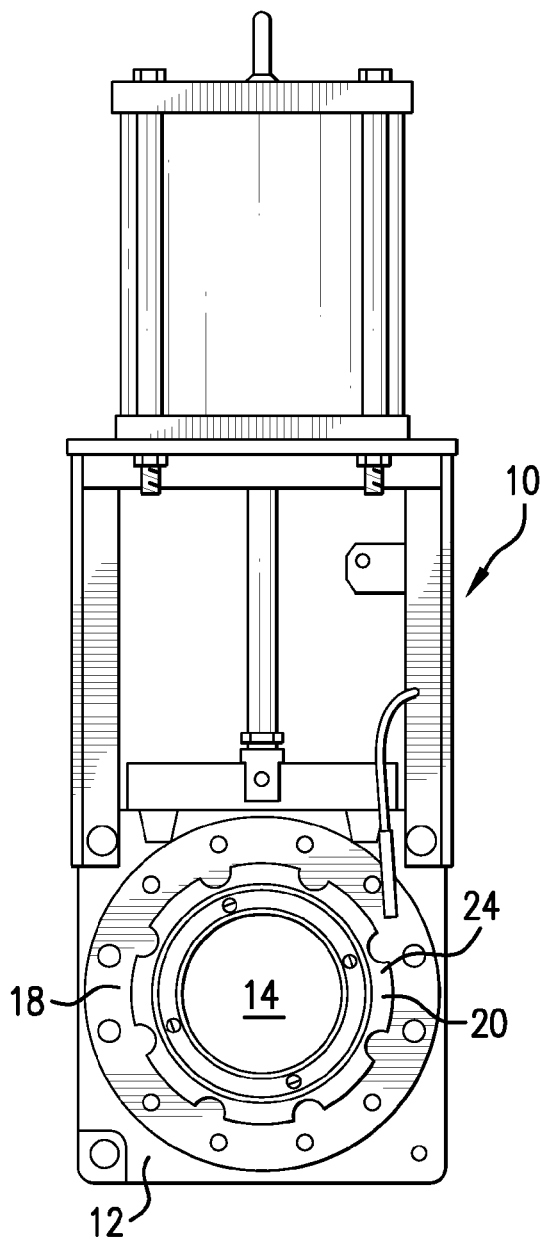
FIGS. 1-4 are plan, side and cross-sectional views of a valve having a valve sleeve.
Figure 2:
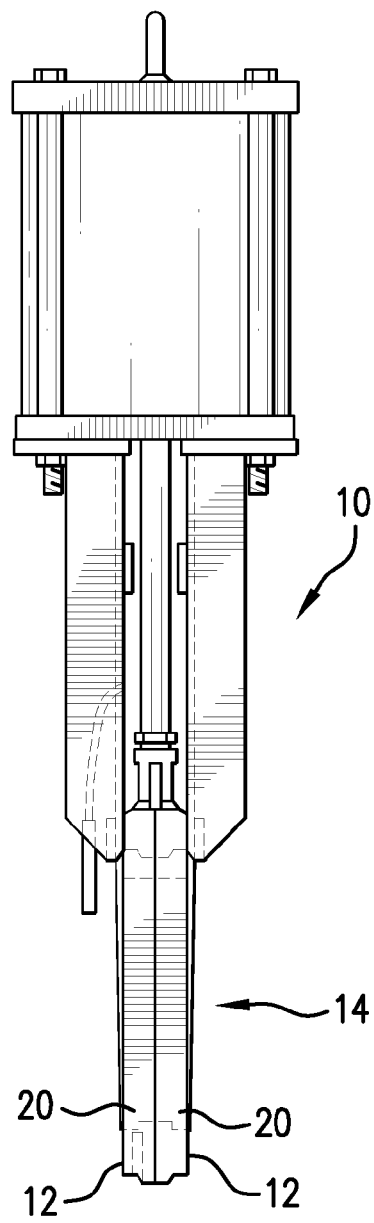
Figure 3:
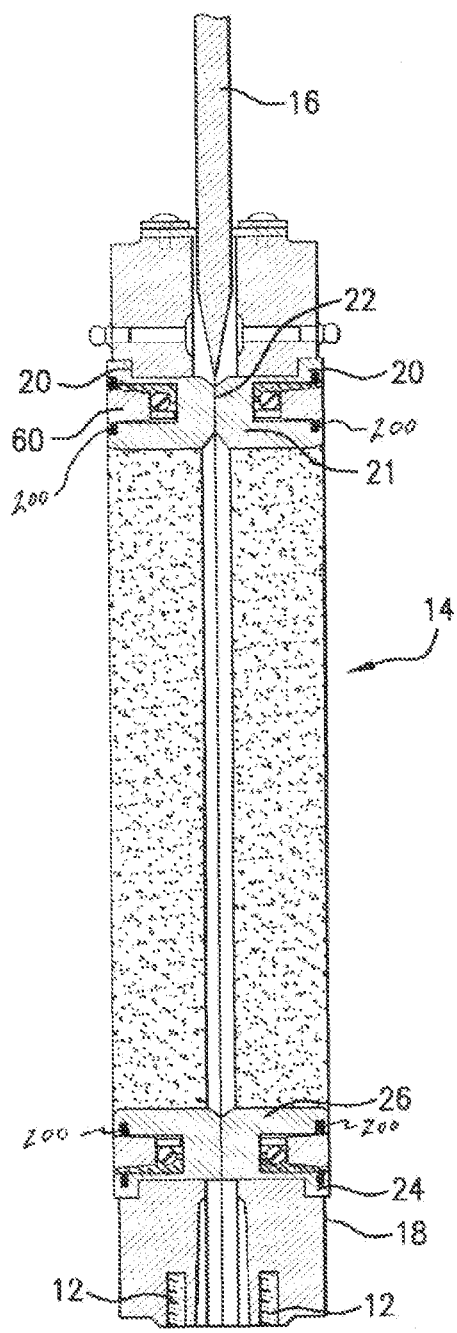

Shown in FIGS. 1 through 4, there is provided an illustrative valve 10 for use with a novel valve sleeve described herein below. The valve 10 includes a housing 12 adapted to be inserted coaxially into a pipeline or other suitable fluid conduit. The housing 12 includes a port or passageway 14 therethrough that can be axially aligned with the pipeline for the flow of materials through the valve 10. As shown in FIG. 2, the valve 10 is preferably formed by two similarly opposed halves that each have an inner surface that defines an axially extending opening. The opening of each housing half is further preferably configured with a sleeve recess to seat or receive a valve sleeve 20, including the novel valve sleeve described herein, for sealing the valve 10. Exemplary embodiments of the valve 10 are shown and described in U.S. Pat. Nos. 3,945,604; 4,257,447; 4,688,597; 4,895,181; 5,271,426; 5,890,700; and 5,370,149, which are attached hereto respectively as Exhibits A-G and further incorporated by reference in their entirety to the extent they disclose a valve configured to receive a valve sleeve. With the two halves of the housing 12 abutted against one another, as seen in FIG. 3, the openings are coaxially aligned such that the end faces of opposed valve sleeves 20 contact one another to define and seal the passageway 14 of the valve. The valve sleeves 20 preferably have a flange portion 24 extending distally to a seat portion 26 and terminating with a seat end face 22 having a lip portion 21. The lip portion 21 can include a ridge 23 configured to conform to and secure the seat portion 26 in the sleeve recess of the valve housing 12. The halves of the assembled valve housing 12 are coupled together such that the lips 21 of the seated valve sleeves 20 engage one another so as to form a seal about the passageway 14 through which materials can flow. Preferably, the passageway 14 defines a substantially circular cross-section although other geometries are possible such as, for example, square, oval or polygonal provided that the opening can properly seat a valve sleeve 20 to seal the valve 10 as described in greater detail herein below.

Figure 4:
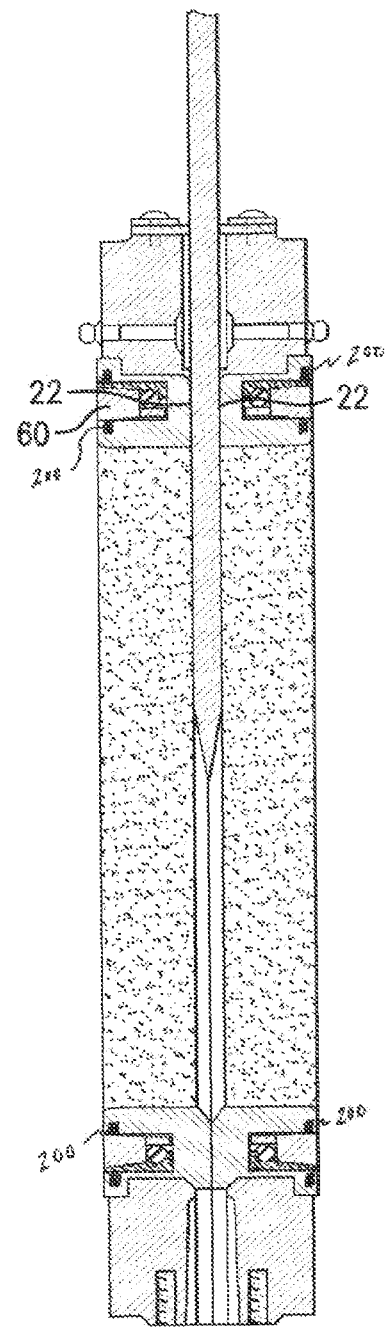

Preferably coupled to the housing 12 is a gate 16 for controlling the flow of material through the passageway 14. The gate 16 has an open position disposed clear from the passageway 14 thereby allowing the flow of material through the valve 10 and a closed position disposed within and perpendicular to the axial direction of the passageway 14 to prevent flow of material therethrough. In moving from the open position to the closed position the gate 16 is configured to translate between the two valve sleeves 20. Shown in FIGS. 3 and 4 is the gate 16 moving from the open position to a partially closed position. As the gate 16 translates into the closed position, the gate 16 engages the end face 22 of each valve sleeve 20 located to each side of the gate 16 to maintain a seal about the valve 10. The gate 16 is preferably mounted for reciprocal movement in and out of the passageway 14. The lower edge of the gate 16 is preferably tapered to provide a relatively sharp straight knife edge as shown to facilitate partition of the engaged lips 21 located at the seat end faces 22 of the opposed valve sleeves 20. To move the gate 16 between the open and closed positions, the gate 16 further includes an actuator (not shown), preferably in the form of a pneumatic or hydraulic cylinder and piston rod arrangement. Alternatively, the actuator may also be a handwheel or an electric motor drive which is configured to provide the required linear movement to the gate 16.

The flange portion 24 of the valve sleeve 20 is configured to support the valve sleeve 20 within the housing 12. The flange portion 24 engages the flange face 18 of the housing 12, as seen in the exemplary embodiment of FIG. 1, by seating within a recess in the flange face of the housing 12. The flange portion 24 is further configured to engage a flange face of a piping element, for example, a pipe coupled to the valve 10.

Figure 5:
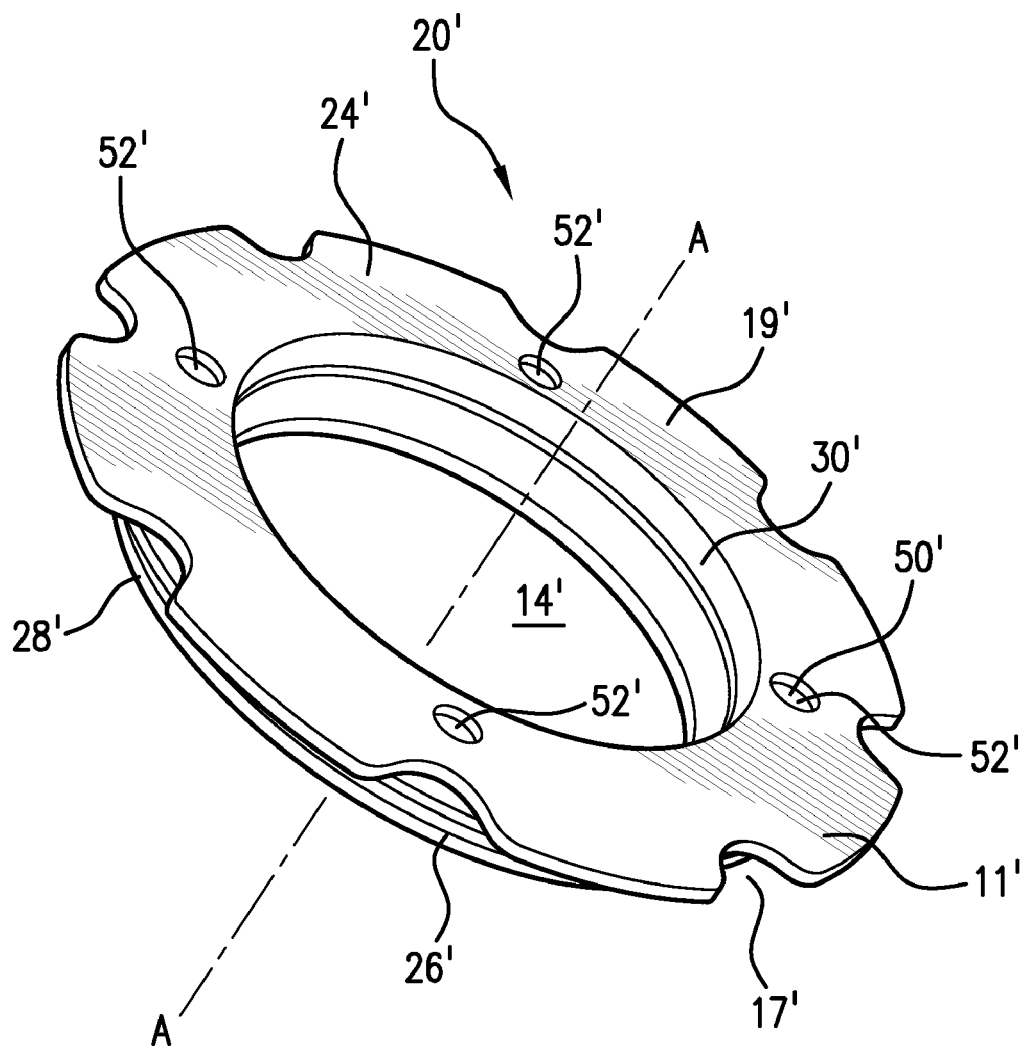
FIG. 5 is an illustrative embodiment of a valve sleeve.

The inventor has discovered a new valve sleeve 20', as seen in FIG. 5, that incorporates a flange portion 24' and a seat portion 26' in a unitary construction so as to provide a one-piece valve sleeve 20' for use with new or existing valves 10. The valve sleeve 20' is preferably made of an elastomeric material which allows the seat portion 26' to be elastically resilient to the stress forces applied by the gate 16 and further enables the flange portion 24' to be resilient to the compressive forces exerted by the flange bolts or other coupling device holding the valve 10 in the pipe assembly.

Figure 5A:
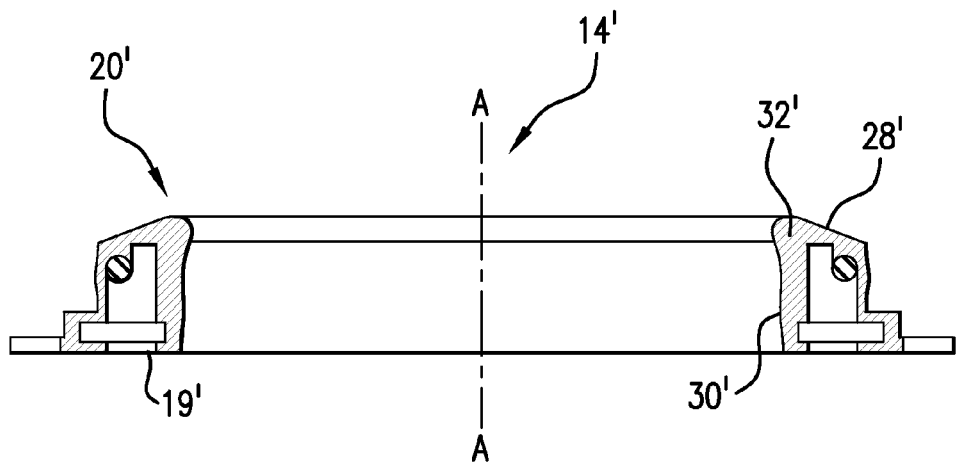
FIG. 5A is a cross-sectional view of the valve sleeve of FIG. 5.

The valve sleeve 20' is generally an annulus or other ring shaped body having an outer surface 28' for engaging the valve housing 12 and an inner surface 30' to define a passageway 14' therethrough having a central axis A-A. The outer surface 28' along the flange portion 24' defines a radial distance from the central axis A-A that is preferably greater than the radial distance defined by the outer surface 28' along the seat portion 26' relative to the central axis A-A. Shown in FIG. 5A is a cross-sectional view of the sleeve 20'. The outer and inner surfaces 28', 30' define the annular wall 32' which is preferably radially spaced and circumscribed about the central axis A-A of the passage 14' to form the body of the valve sleeve 20'. Because the sleeve 20' is preferably of a unitary construction, the wall 32', as seen in greater detail in FIG. 5B, has a proximal first end portion which includes the flange portion 24' having an flange end face 19'. The wall 32' axially extends to the seat portion 26' and terminates at a distal second end portion with the seat end face 22'. Because the sleeve 20' is of a unitary construction, the wall 32' preferably has homogenous material properties extending from the flange end face 19' to the seat end face 22'.

The outer surface 28' along the seat portion 26' of the wall 32' is preferably configured substantially similarly to the outer surface of the seat portions 26 in known valve sleeves, as described above, so as to be insertable into existing valves 10. More specifically, the seat portion 26' preferably includes a lip portion 21' at the end of the valve sleeve to engage an interior groove within the valve housing 12 to secure the valve sleeve in the sleeve recess of the housing 12 and further facilitate a sealed engagement with either an opposing valve sleeve or the gate 16. The lip portion 21 preferably includes a locking bead or ridge 23' disposed along the seat portion 26'. The ridge 23' is preferably located at approximately the midpoint of the entire axial length L of the valve sleeve 20' and more specifically at about 53% of L measured from the flange end face 19'. The ridge 23' further preferably defines the radial outermost portion of the wall 32' along the seat portion 26 and is moreover preferably configured for engaging a recess within the housing 12 to support the valve sleeve 20' therein. The ridge 23' can be configured to prevent the sleeve 20' from falling out of the housing 12 when the valve 10 is not installed in the pipe assembly. The ridge 23' can also prevent slurry or other material buildup that may migrate between the valve sleeve 20' and the housing 12.

Distal of the ridge 23', the lip portion 21' radially tapers toward the central axis A-A. Preferably, the radial taper has a first tapering portion 25' and a second tapering portion 27'. The first tapering portion 25' defines a first angle α relative to a line parallel to the central axis of the passageway 14' and the second tapering portion 27' defines a second angle β relative to an angle perpendicular to the central axis of the passageway 14'. Preferably, the first angle α is about five degrees (5°) to about fifteen degrees (15°) and is more preferably about ten degrees) (10°). The second angle β is preferably about fifteen degrees) (15°) to about twenty-five degrees) (25°) and is more preferably about twenty-one to twenty-three degrees (21°-23°).

The outer surface 28' preferably defines a continuous transition with the inner surface 30' of the wall 32' to further define the lip portion 21'. More specifically, the second tapering portion 27' is continuous with a first curved portion 34' of the inner surface 30'. The curved portion 34' is preferably convex relative to the passageway 14' to define a curved surface for engaging either the lip portion 21' of an opposing sleeve 20' in the valve 10 or the flow control gate 16. The convex curved portion defines a radius of curvature ranging between about 0.15 inches to about 0.25 inches and more preferably is about 0.19 inches.

In a preferred embodiment of the valve sleeve 20', the inner surface 30' can include additional curved portions axially continuous with the curved portion 34' to define a surface that can facilitate the flow through of material through the valve sleeve 20' and further inhibit turbulence and/or build-up of the material. Preferably, the inner surface 30' includes a second curved surface 36' and a third curved surface 38' continuous in series with the first curved surface 34' so as to define a groove along the inner surface 30'. The curved surfaces can be configured as concave or convex relative to the passageway 14' with a radius of curvature that facilitates the flow through of material. Preferably, the second curved surface 36' is concave and defines a radius of curvature of about 0.75 inches to about 1.25 inches and is more preferably about 1 inch. The third curved surface 38' is preferably concave and defines a radius of curvature of about 0.25 inches to about 0.5 inches and is more preferably about 0.375 inches. The continuous curved surfaces 36', 38' define a radial groove along the inner surface 30', and preferably circumferentially about the seat portion 26', that can facilitate the flow of material through the passageway 14' and minimize the build-up of material in the sleeve 20'.

Figure 6:
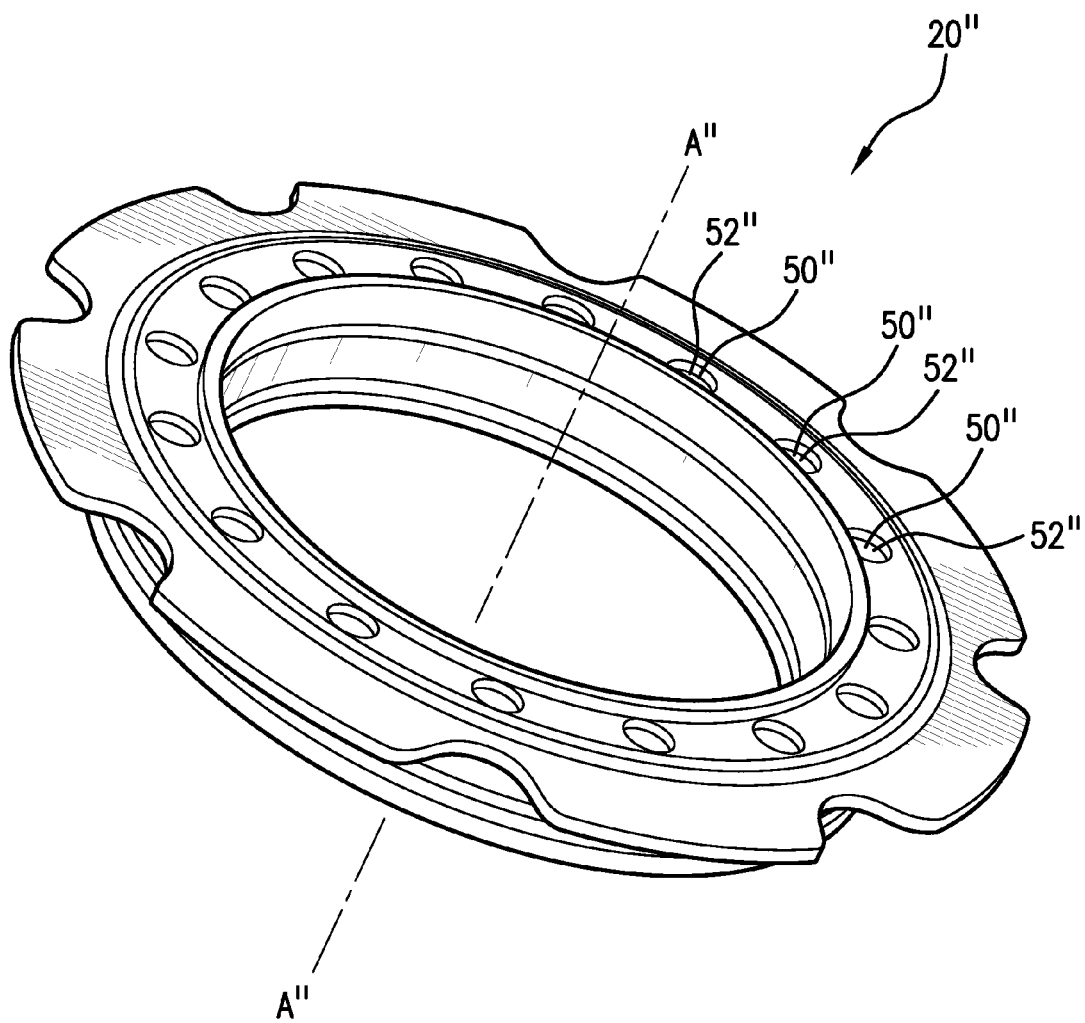
FIG. 6 is an illustrative embodiment of another valve sleeve.
Figure 6A:
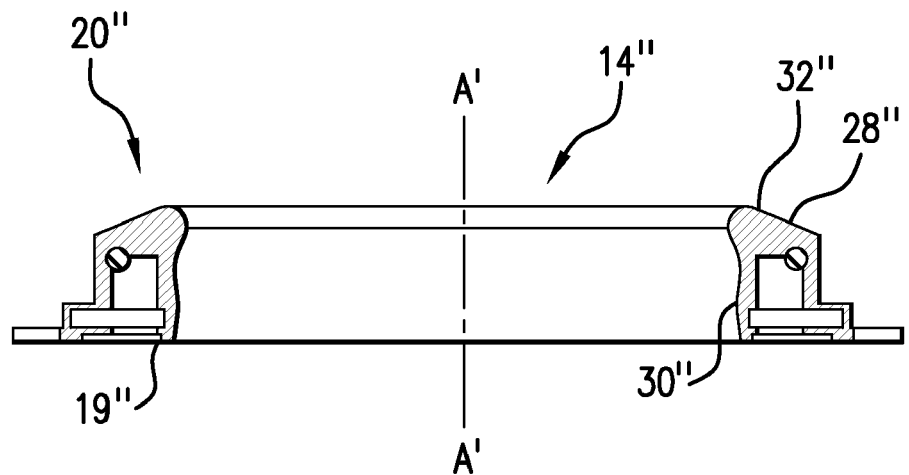
FIG. 6A is a cross-sectional view of the valve sleeve of FIG. 5.
Figure 6B:
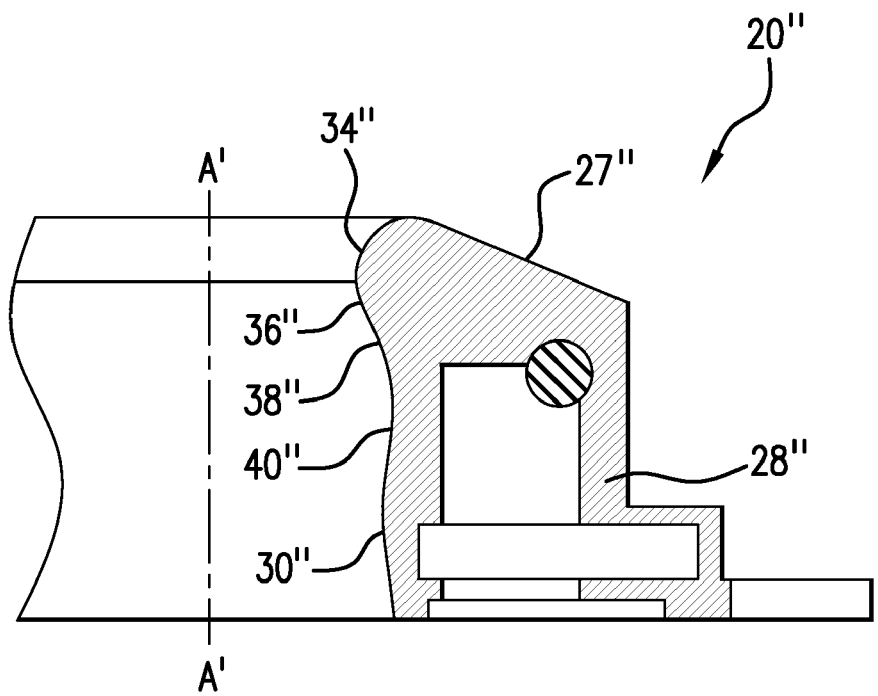
FIG. 6B is cross-sectional detailed view of the valve sleeve of FIG. 5.

In an alternative embodiment of the valve sleeve 20", as seen in FIGS. 6, 6A and 6B, the inner surface 30" can include a second curved surface 36", a third curved surface 38" and a fourth curved surface 40" continuous in series with the first curved surface 34 so as to define an alternate groove along the inner surface 30". Preferably, the second curved surface 36" is convex and defines a radius of curvature of about 0.30 inches to about 0.45 inches and is more preferably about 0.375 inches. The third curved surface 38" is preferably concave and defines a radius of curvature of about 0.625 inches to about 0.7 inches and is more preferably about 0.641 inches. The inventor has discovered that the preferred radius of curvature at the third curved surface 38" can reduce purge from the valve 10 during cycle of the gate 16 because the curved surface 38" can facilitate a rebound effect in the sleeve 20". The fourth curved surface 40" is preferably convex and defines a radius of curvature of about 0.30 inches to about 0.45 inches and is more preferably about 0.375 inches. The continuous curved surfaces 36", 38" and 40" define a radial groove along the inner surface 30', and preferably circumferentially about the seat portion 26", that can facilitate the flow of material through the passageway 14' and minimize the build-up of material in the sleeve 20"'.

The inner and outer surfaces 28', 30' of wall 32' preferably define constant profiles circumscribed about the central axis A-A of the passageway 14'. The circumferentially constant profiles allow for the valve sleeve 20' to be inserted into the valve housing 12 without concern as to the radial orientation of the sleeve 20'. Alternatively, either the outer surface 28' or the inner surface 30' may define a first profile partially circumscribed about the central axis of the passageway 14' and a second profile, different from the first, partially circumscribed about the remainder of the passageway 14'. For example, the curved surfaces 36', 38' of the inner surface may be circumscribed approximately 180°) about the central axis A-A so as to define a substantially semi-circular groove along the inner surface 30'.

Where the profile of the inner surface 30' includes one or more curved surfaces circumscribed about the central axis A-A of the passageway 14', the diameter of the passageway 14' can vary in a direction along the central axis. The one or more diameters defined by inner surface 30' define the nominal valve size of the valve 10'. For example, where the inner surface 30' defines an input diameter at the flange end face 19' of about six inches (6 in.) and an output diameter of about six inches (6 in.) at the seat end face 22' with an interior groove in between of about 5.75 inches, the nominal size of the valve sleeve 20' and the valve 10 is six inches.

Figure 5B:
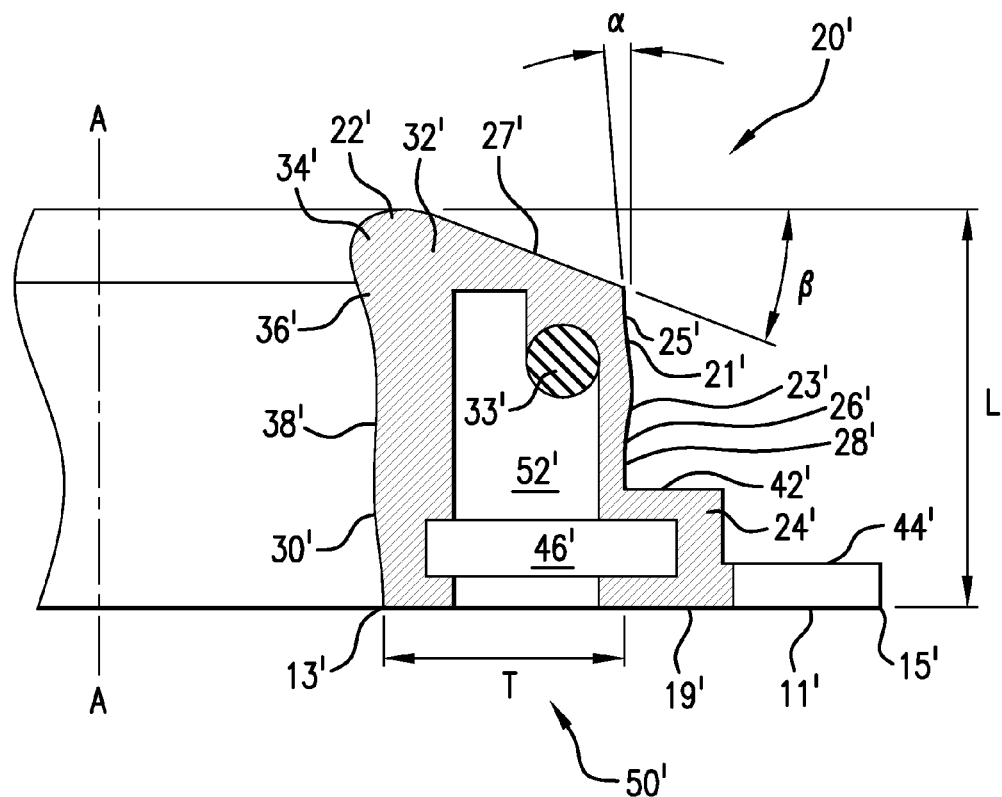
FIG. 5B is cross-sectional detailed view of the valve sleeve of FIG. 5.

Located between the inner and outer surfaces 28', 30' of the wall 32' is a chamber 33' as seen for example, in FIG. 5B. The chamber 33' is located within the seat portion 26' and is preferably located within the lip portion 21' and more preferably located distal of the ridge 23'. In addition, the chamber 33' is radially closer to the outer surface 28' than to the inner surface 30'. Where the dimension T is the radial distance between the outer surface 28' and the inner surface 30', the radial spacing t between the chamber 33' and the outer surface 28' has been found to be about 11.5% of thickness T for all nominal sizes of valve sleeve 20'. In addition, where the axial distance between flange end face 19' to the seat end face 22' is the length L, the axial distance x from the flange end face 19' to about the center point of the cross-sectional area of the chamber 33' is about 65% of the length L.

The chamber 33' is configured so as to house, or more preferably encase, a substrate or stiffening element within the seat portion 26' to provide radial resistance to, for example, shearing forces exerted by the gate 16 on the valve sleeve 20' as the gate 16 between the open and closed positions. Preferably, the chamber 33' is continuous about the central axis A-A of the passageway 14' so as to define a ring having a substantially circular cross-section for housing a tubular ring shaped substrate. Alternatively, the chamber 33' can be any other geometry in plan and/or cross-sectionally such as, for example, rectangular or other polygonal shape for housing a correspondingly shaped substrate. Further in the alternative, a plurality of chambers can be radially disposed about the central axis A-A of the passageway 14' within the seat portion 26' for individually housing a plurality of stiffening elements.

Figure 7:
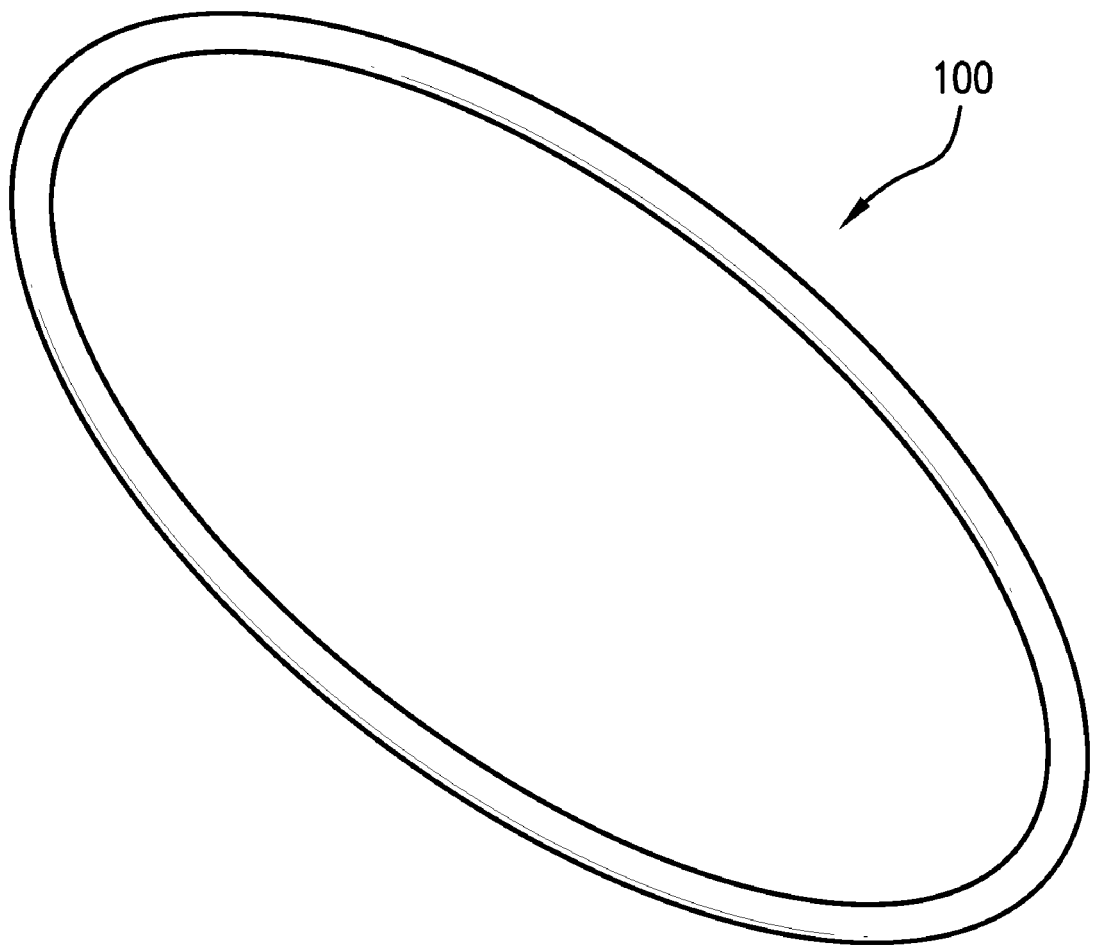
FIG. 7 is an illustrative support ring for use in a valve sleeve.

The chamber 33' is preferably substantially ring shaped for encasing a stiffener ring 100 as seen in FIG. 7. The stiffener ring 100 is preferably made from a mild steel however other steels, alloys and or composites could be used provided the ring demonstrated sufficient radial strength. The location of the chamber 33' dictates the location of the ring 100. It has been found that the particular configuration and position of the stiffener ring 100 results in two primary advantages: (1) the ring 100 radially supports the ridge 23 and prevents the pliable sleeve material from following the gate 16 during its cycle; and (2) the stiffener ring 100 can facilitate alignment of the opposing sleeves 20' installed in the valve housing 12. As the gate 16 of the valve 10 moves downward into the closed position, the stiffener ring 100, due to the ring positions being relatively surrounded by the compressible sleeve material, functions somewhat as a fulcrum to relieve some of the sealing compression between the lips 21' of the opposing valve sleeves 20' so that the tapered lower knife edge of the plate may more easily separate the lips. In so doing, the sleeves move into the space surrounding the gate and this action pulls the sleeve material back from the area of the lips 21. This in turn reduces friction between the downwardly moving gate, which is slidably guided between seat end faces 22', and the opposing lips 21'. Accordingly, the stiffener ring 100 provides for good smooth reduced friction sliding contact between opposing sleeves 20' and the gate 16.

The inner and outer surfaces 28', 30' of the wall 32' initiate from the flange end face 19'. The flange end face 19' is preferably substantially perpendicular to the central axis A-A for engagement with the flange face of another piping element in the piping assembly. Referring again to FIG. 5B, the flange end face 19' includes an outer perimeter 15' and an inner perimeter 13' to define the opening to the central passageway 14'. The flange face 19' defines a preferably annular or ring shaped planar surface with the inner and outer perimeters 13', 15' being substantially circular and respectively defining an inner diameter ID and an outer diameter OD with a center point that is collinear with the central axis of the passageway 14'. Alternatively, the inner and outer perimeters 13', 15' can be any geometry such as, for example, rectangular or polygonal provided the flange end face 19' can engage the flange surface of the valve housing 12 and material can flow through passageway 14' of the valve sleeve 20.

The inner and outer surfaces 28', 30' extend axially from the flange end face 19' to define the flange portion 24'. The outer surface 28' along the flange portion 24' preferably defines a first shelf 42' and further preferably defines a second shelf 44'. The first shelf 42' defines a transition from the flange portion 24' to the seat portion 26' in the unitary construction of the valve sleeve 20' and further defines an axial thickness of the flange portion 24' to engage a recess or other surface of the flange face in the housing 12.

The second shelf 44' defines an axial thickness of flange portion 24' that is different and preferably less than the axial thickness defined by the first shelf 42. The second shelf 44' is preferably circumscribed about the first shelf portion so as to further define a gasket portion 11' of the flange portion 24'. The gasket portion 11' is preferably of such an axial thickness so as to provide an adequate seal to the valve 10 in a piping assembly and thereby eliminating the need for a separate gasket material. Accordingly, the gasket portion 11' is preferably configured such that the flange portion 24' can be radially aligned with the bolt hole pattern of the housing 12. Thus, the gasket portion 11' preferably includes one or more radially disposed scallops or voids 17', as seen in FIG. 5 to trace the bolt hole pattern of the housing 12. The gasket portion 11' can provide a seal between the valve 10 and an adjacent piping element thereby eliminating the need for a separate gasket element. Moreover, the gasket portion 11' can be configured independent of the pipe size to which the valve is to be coupled. The inventor has discovered in a 5,000 cycle test of the valve 10 and sleeve 20' in a piping assembly, that a complete seal is achieved when applying, at a minimum, 35-40 ft-lbs of torque at the flange bolts. Known sleeves using the two-piece sleeve design with support disc may require as much as 100-125 ft-lbs of torque to create an adequate seal.

To resist overcompression of the flange portion 24' of the valve sleeve 20' when the valve 10 is coupled to another element, the flange portion 24' is configured to define another chamber 46' as seen for example in FIG. 5B. The chamber 46' is preferably disposed between the inner surface 30' and the outer surface 28' so as to be completely enclosed within the wall 32'. More preferably, the chamber 46' is located proximate of the first shelf 42' so as to locate the chamber 46' within the recess of the flange face 18 of the housing 12 when the valve sleeve 20' is installed. The chamber 46' extends axially preferably to a point proximal of the first shelf 44' such that the chamber 46' is located completely within the flange portion 24' of the sleeve 20'.

The chamber 46' is configured so as to house, or more preferably encase, a substrate within the flange portion 24' to provide a stiffening element for providing axial support and/or compressive resistance to, for example, the compressive force exerted by the flange bolts coupling the valve 10 to the piping assembly. Preferably, the chamber 46' is continuous about the central axis of the passageway 14' so as to define a ring for housing a ring shaped substrate. Alternatively, the chamber 46' can be any other geometry such as, for example, rectangular or polygonal for housing a correspondingly shaped substrate. Further in the alternative, a plurality of chambers radially disposed about the central axis and within the flange portion 24' can be provided for housing a plurality of stiffening elements.

Figure 8:
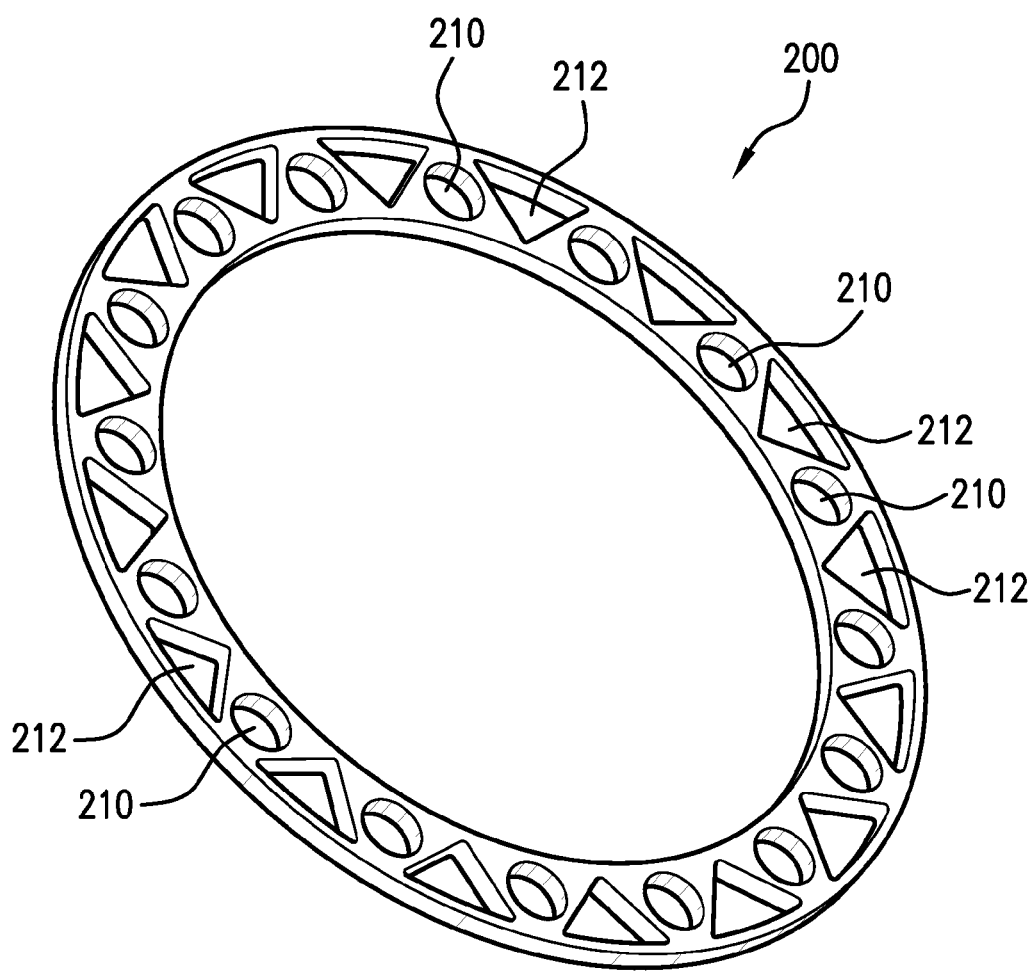
FIG. 8 is an illustrative embodiment of a ring plate for use in a valve sleeve.

The chamber 46' is preferably substantially ring shaped having a rectangular cross-section for encasing the ring shaped substrate or plate 200 as seen in FIG. 8. The plate 200 defines an inner diameter and an outer diameter each preferably dimensioned such that the plate 200 can be completely housed within the chamber 46' of the valve sleeve 20'. In one example in which the valve sleeve 20' is configured for a nominal six inch valve, a preferred plate 200 has an outer diameter of about eight inches, an inner diameter of about six inches, more preferably 6.3 inches and a uniform thickness of about three-sixteenths of an inch (3/16 in.). The plate 100 is preferably made of steel such as, for example, HRMS ASTM 36, stainless or other suitable steel. Alternatively, the plate 100 can be made from any other material capable of providing the compressive strength and axial support to the flange portion 24' of the valve sleeve 20'.

Referring again to FIG. 5, the flange end face 19' of the valve sleeve 20' can include one or more openings 50' radially spaced from the central axis. Preferably, the opening 50' is substantially circular although other geometries such as, for example, rectangular or other polygonal shapes are possible. As seen in FIG. 5B, the wall 32' further defines at least one axially extending third chamber 52' disposed between the outer and inner surfaces 28' and in communication with the opening 50'. The third chamber 52' is preferably substantially cylindrical having a circular cross-sectional area along a central axis preferably parallel to and radially spaced from the central axis A-A. The chamber 52' extends distally from the flange end face 19' and preferably extends from the flange portion 24' into the seat portion 26', terminating proximal of the seat end face 22'. Where first and second chambers 33', 46' continuously circumscribe the central axis A-A of the passageway 14, the third chamber 52' is preferably in communication with the first and second chambers 33', 46'.

The valve sleeve 20' can include a plurality of chambers 52' each having an opening 50' equiradially disposed about the central axis A-A. For example, as seen in FIG. 6, the sleeve 20" can have sixteen chambers 52" spaced apart by about 22.5°) or alternatively, the sleeve 20' can have four chambers 52', as seen in FIG. 5, each spaced apart by about 90°. Preferably, the number of chambers is minimized so as to minimize the stress concentrations in the sleeve 20' around the edges defining the chambers 52'. As with known valves, the number of chambers 52' may vary with the nominal size of the valve. Alternatively, a relationship between the total volume of the chambers 52' and the total volume of the sleeve 20' can be provided without regard to valve size.

Figure 5C:
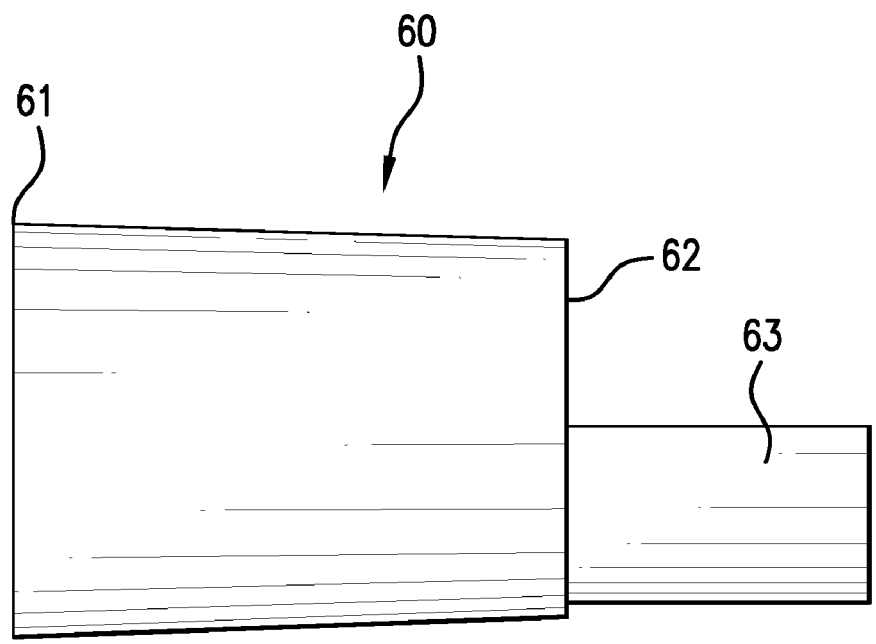
FIG. 5C is an illustrative embodiment of a pin plug for use with a valve sleeve.
Figure 5D:
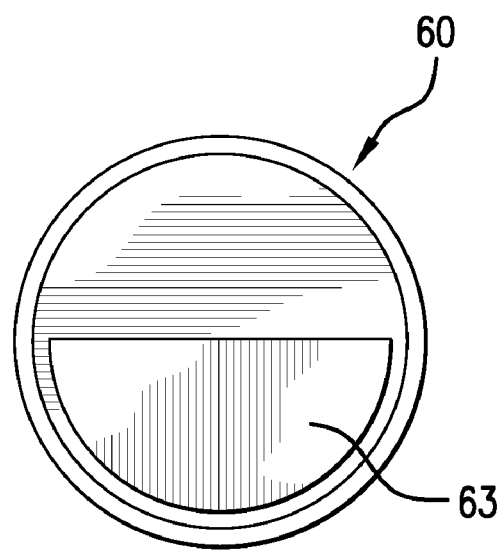
FIG. 5D is a plan view of the pin pug of FIG. 5C

A pin plug 60 can be provided, for example as seen in FIG. 5C, for insertion into one or more of the chamber 52' to provide additional support to the sleeve 20' and further minimize the presence or effect of any stress concentrations. More preferably, every chamber 52' is substantially filled with the pin plug 60. The pin plug 60 is preferably a cylindrical axially extending member having a base end 61' dimensioned so as to substantially fill the cross-sectional area of an opening 50' in the flange end face 19'. The pin plug 60 further includes an insertion end 62 for locating the pin plug 60 within the chamber 52'. The insertion end 62 is preferably dimensioned such that the pin plug 60 tapers in the axial direction narrowly from the base end 61. Moreover, the insertion end 62 is preferably axially spaced from the base end 61 such that the pin 60 substantially fills the chamber 52'. Preferably, the pin 60 does not axially extend into the first chamber 33' of the wall 32'. The insertion end 62 can further include an extension 63 so as to axially extend and completely fill the chamber 52 yet avoid intersecting the first chamber 33'. Preferably, the extension 63 defines a semi-circular cross-section, as seen in FIG. 5D, to substantially fill the portion of chamber 52' located between the first chamber 33' and the wall 32' and thereby frame the chamber 33'. The pin 60 is preferably made of a rubber material and can further be made of a materials substantially similar to the wall 32' of the valve body 20'. Accordingly, the pin 60 preferably is of a durometer substantially similar to the wall 32' or can alternatively be harder or softer than the wall 32'. Further in the alternative, the pin 60' can be made from a plastic, resilient closed cell foam, or any other material capable of being formed into the pin 60 and further being capable of supporting the sleeve 20.

As noted, the valve sleeve 20' is of a unitary or one-piece construction for insertion into a valve housing 12. Preferably, the valve sleeve 20' is made by a molding process that includes transfer or compression molding, and more preferably includes injection molding. To form the valve sleeve 20', the stiffening elements ring 100 and plate 200 are located within a mold 300 and an elastomeric material introduced therein. The material is permitted to cure and set to form the valve sleeve 20'.

Figure 9:
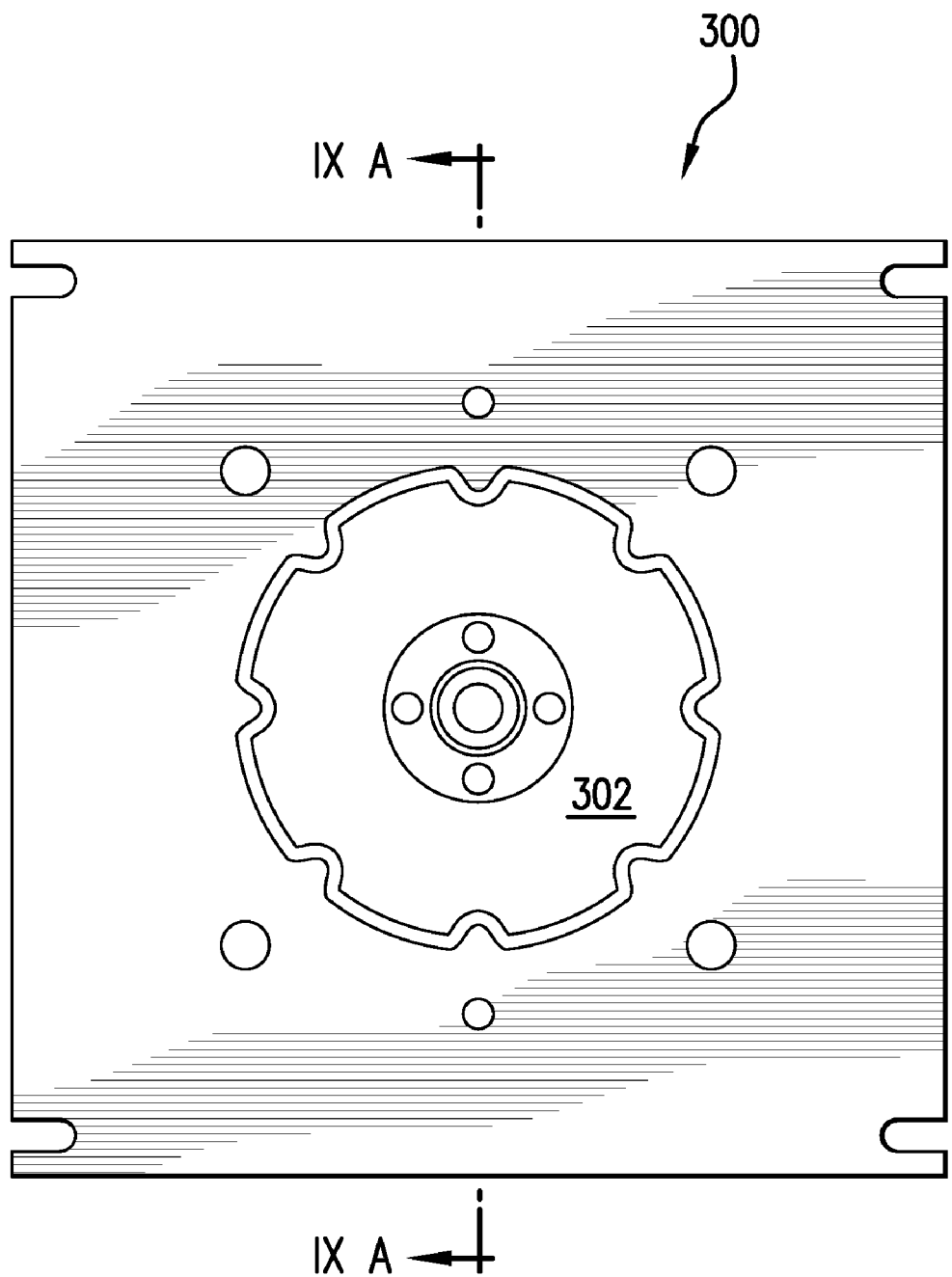
FIG. 9 is an illustrative embodiment of a mold for forming a valve sleeve.
Figure 9A:
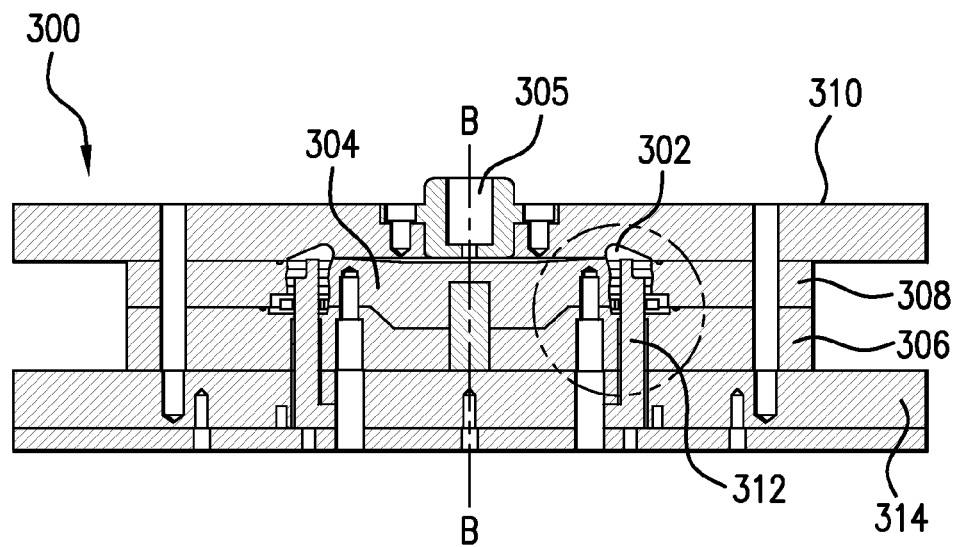
FIG. 9A is cross-sectional view of the mold of FIG. 9.
Figure 9B:
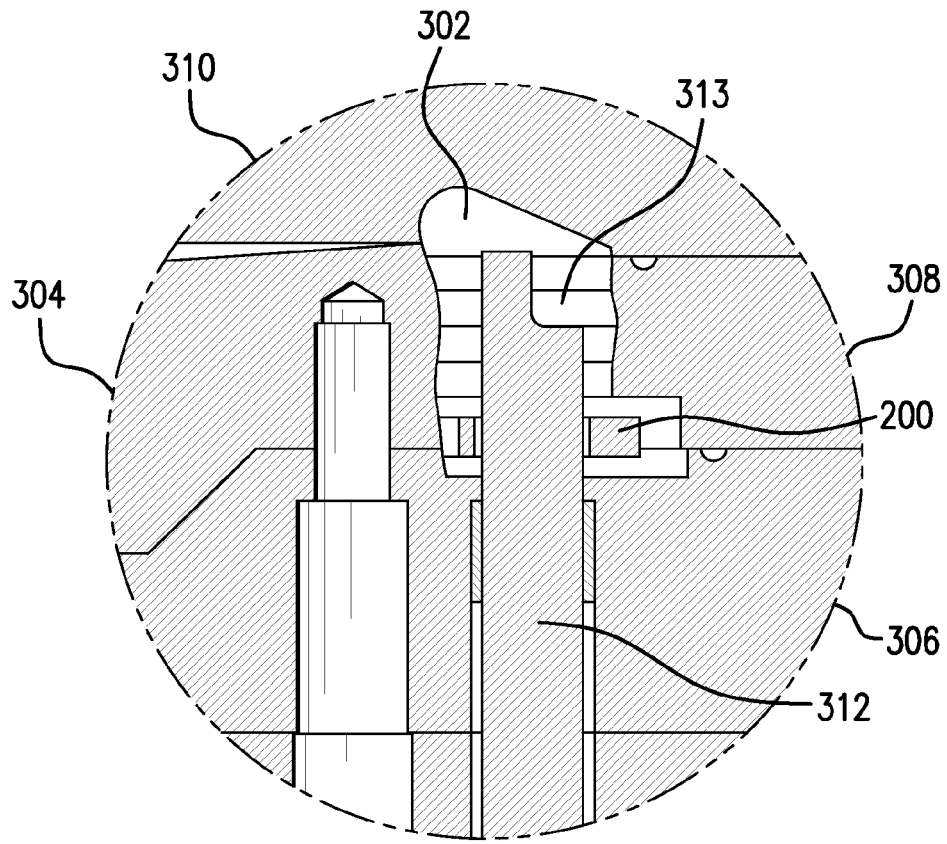
FIG. 9B is a cross-sectional detailed view of the mold of FIG. 9.

Shown in FIG. 9 is a plan view of a mold 300 for forming valve sleeve 20. The mold 300, as seen in cross-section in FIG. 9A, includes an inner surface defining a chamber 302 having a central axis, a center or core member 304 axially extending through the chamber 302 along the central axis, and at least one input port 305 in communication with the chamber 302 for introducing an elastomeric material into the chamber 302 to form the valve sleeve body 20' by way of transfer or compression molding and more preferably by way of injection molding. The inner surface of the mold 300 is preferably circular cylindrical and the center member 304 is also preferably circular cylindrical such that the chamber 302 is substantially annular or ring-shaped. The inner surface of the mold 300 and the center member 304 are contoured so as to define respectively the outer surface 30' and inner surface 28' of the valve sleeve 20' during valve sleeve formation. More specifically, the inner surface of the mold 300 and the center member 304 are contoured so as to define the outer and inner surfaces of the flange portion 24' and the seat portion 26' of the valve sleeve 20' as described above. As seen in FIG. 9B, the inner surface of the mold 300 which defines the chamber 302 outlines the wall 32' of the sleeve 20'.

The mold 300' preferably includes a bottom plate 306, a center plate 308 and a top plate 310 axially coupled together and centrally aligned along a central axis so as to form the inner surface of the mold 300 and define the chamber 302. The center member 304 can be coupled to the mold 300 and introduced into the chamber 302 or more preferably engages a central recess formed in the bottom plate 306.

To form the valve sleeve 20', stiffening elements or substrates are located within the chamber 302 prior to encapsulation by the elastomeric material. More specifically, the ring 100 is disposed within the portion of the chamber 302 that is to form the seat portion 26' and the ring plate 200 is disposed within the portion of the chamber 302 that is to form the flange portion 24'. To locate the ring 100 and the ring plate 200 in the chamber 302, the mold 300 includes one or more location pins 312 radially disposed about the center member 304. Preferably, a sufficient number of location pins 312 are radially disposed about the center member 304 so as to circumscribe the center member 304. The base plate 314 engages the bottom plate 306 such that the location pins 312 are aligned and inserted through the pin holes of the base plate 306 and circumferentially located about the center member 304.

The location pins 312 are preferably substantially cylindrical members each extending axially parallel to the center member 304. The location pin 312 is dimensioned and configured to engage the ring plate 304 so as to axially and radially locate the ring plate 304 within the portion of the chamber 302 shaping the flange portion 24' of the valve sleeve 20'. Referring to FIG. 8, the ring plate 200 preferably defines one or more voids 210. The voids 210 are substantially circular to correspondingly engage the location pins 312. The location pins 312 and voids 210 can define any geometry provided the plate 200 and location pins 312 can engage one another. In forming the sleeve 20', the ring plate 200 is aligned with one or more available location pins 312 such that any available location pin 312 is inserted through an available void 210. Because the locations pins 312 preferably circumscribes the center member 304 of the mold, the ring plate 200 is accordingly centered about and circumscribes the center member 304.

The location pins 312 are also preferably configured to radially locate the ring 100 about the center member 304 and within the seat portion of the valve sleeve 20'. As seen in FIG. 9B, the location pins 312 preferably include at one end a notch 313 which is located within the chamber 302 that forms the seat portion 26' of the valve sleeve 20'. The notch 313 preferably forms a right angle having a vertical surface parallel to the central axis of the mold 300 and a horizontal surface perpendicular to the central axis. In forming the valve sleeve 20', the ring 100 is disposed over the location pins 312. The ring 100 is dimensioned and configured so as to engage the vertical and horizontal surfaces of the notch 313, thereby centrally aligning the ring 100 with and circumscribing ring 100 about the center member 304.

The mold 300 is preferably configured to also properly axially align the ring 100 and the ring plate 200 respectively within the seat portion 26' and the flange portion 24'. To facilitate the proper axial location of the ring 100 and ring plate 200, the base plate 314 preferably include springs (not shown) which engage the bottom plate 306. The springs allow for the axial displacement of the location pins 312 relative to the remainder of the mold 300 during the molding process. In a preferred method of injection molding the valve sleeve 20', the assembled mold 300, with the ring 100 and ring plate 200 located in the chamber 302, as described above, is placed in a press which compresses the springs of the base plate 314 and axially translates the location pins 312 relative to the chamber 302. The axial translation of the location pins 312 properly axially locate the ring 100 and the ring plate 200 within the chamber 302 so that upon introduction of the elastomeric material into the mold 300 the ring 100 and the ring plate 200 are respectively properly encased in the seat portion 26' and flange portion 24' of the valve sleeve 20'.

The valve sleeve 20' is formed such that the both the ring 100 and the ring plate 200 are fully encased in elastomeric material. Preferably, the input port 305 of the mold 300 is located in the top plate 310 such that the elastomeric material is injected into the mold 300 equiradially. More specifically, the input port 305 is preferably aligned with the central axis of the mold 300 such that the elastomeric material is distributed substantially evenly 360° about the center member 304.

To facilitate the encasement of the substrate members 100, 200, the ring 100 and ring plate can be configured for distributing the elastomeric material throughout the mold. For example, again referring to FIG. 8, the ring plate 200 can include one or more voids 212 disposed between pin engaging voids 210. Voids 212 are preferably triangular shaped to facilitate the flow of elastomeric material about the ring plate 200 and throughout the chamber 302. More specifically, the voids 212 provide greater surface area to the ring plate 200 over which the elastomeric material entering the chamber 302 can be introduced and encapsulate.

Although the mold 300 can be configured for compression or transfer mold processing, the inventor has discovered that using the mold 300 in an injection mold process can reduce the time to sleeve formation over transfer or compression molding by over ninety percent. For example, where compression or transfer mold processing to form a nominal six inch valve sleeve 20' may take about forty-five to about fifty minutes, the same sleeve 20' may require about four to five minutes. Following injection of the elastomeric material into the mold 300 and further following an appropriate set time, the valve sleeve 20' is molded and formed as the above-described one-piece construction. The mold sleeve 20' is then removed from the mold. The location pins 312 separate from the elastomeric material thereby defining the opening 50' in the flange portion 24' and the axially extending chamber 52' in the wall 32'. Remaining fully encapsulated in the valve sleeve 20' are the ring 100 and the ring plate 200.

A finishing process is applied to the molded valve sleeve 20' to prepare the piece for use in a valve 10. The preferred injection process may leave behind elastomeric material in the passageway 14' of the sleeve 20'. The excess material is preferably removed and the inner surface 30' of the sleeve 20' is treated so that the passageway 14' has a smooth surface over which material may flow. Any suitable elastomeric material can be used to form the valve sleeve such as, for example, natural rubber so long as the material is capable of being used in the molding process. Preferably, the material utilized in forming the sleeve is selected so as to be well suited for the environment in which the valve 10 is to be employed. Accordingly, depending upon the application of use, appropriate elastomeric materials for forming the sleeve 20' include but are not limited to: gum rubber, EPDM-HTP, Nitrile and Nitrile-HTP, Hypalon, and Fluoroelastomer. Moreover, because the sleeve 20' is preferably constructed from a homogenous material, the valve sleeve 20' tends to have substantially the same chemical resistant qualities throughout.

Figure 10:
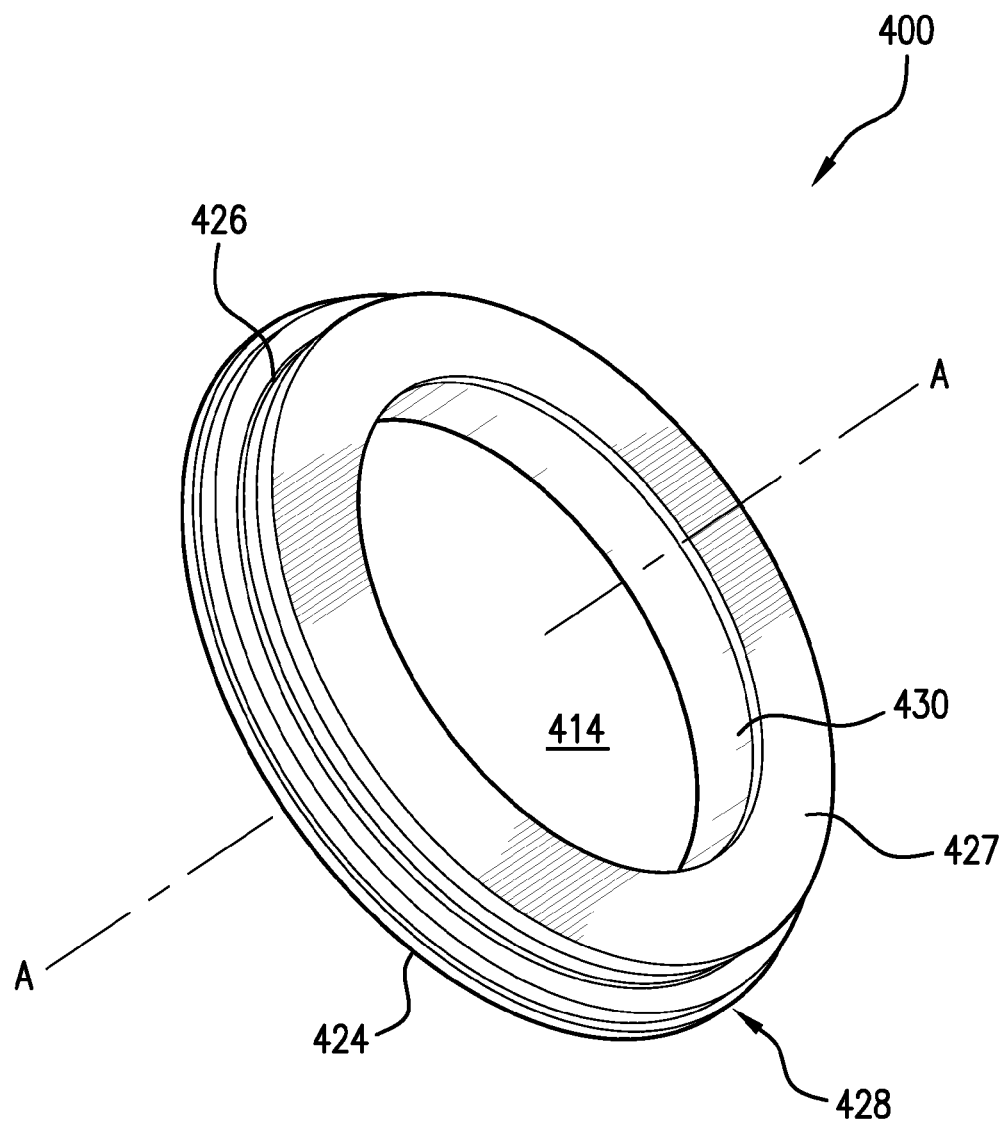
FIG. 10 is a perspective view of an alternative embodiment of valve sleeve in accordance with an embodiment of the present invention.

FIG. 10 illustrates a perspective view of an alternative embodiment of valve sleeve 400 having a flange portion 424 and a seat portion 426. Valve sleeve 400 has a unitary construction to provide a one-piece sleeve for use with new or existing valves 10. Similar to the sleeve illustrated in FIG. 5, sleeve 400 is preferably made of an elastomeric material which allows the seat portion 426 to be elastically resilient to the stress forces applied by gate 16 (shown in FIGS. 3 and 4) and further enables the flange portion 424 to be resilient to the compressive forces exerted by the flange bolts or other coupling device holding valve 10 within the pipe assembly. Valve sleeve 400 is generally an annulus or other ring shaped body having an outer surface 428 for engaging the valve housing 12 and an inner surface 430 to define a passageway 414 therethrough having a central axis A-A. The outer surface 428 along the flange portion 424 defines a radial distance from the central axis A-A that is preferably greater than the radial distance defined by the outer surface along the seat portion 426 relative to the central axis A-A.

Figure 10A:
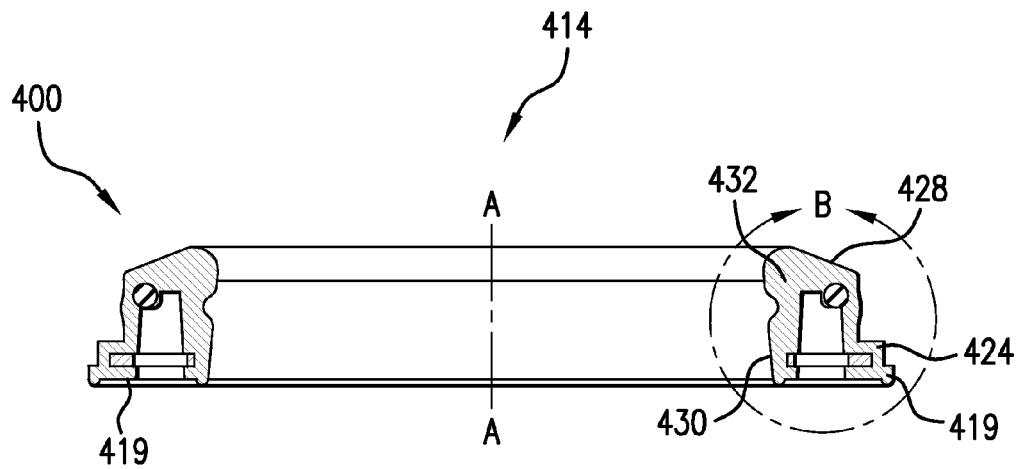
FIG. 10A illustrates a cross-sectional view of the sleeve shown in FIG. 10 in accordance with an embodiment of the present invention
Figure 10B:
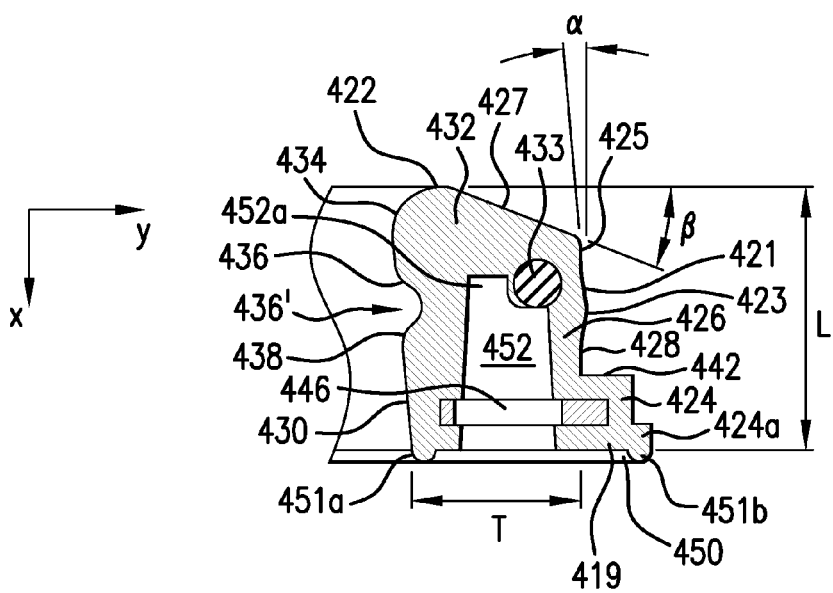
FIG. 10B illustrates a detailed cross-sectional view (identified as section B in FIG. 10A) in accordance with an embodiment of the present invention.

FIG. 10A illustrates a cross-sectional view of the sleeve 400' and FIG. 10B illustrates a detailed cross-sectional view (identified as B in FIG. 10A) of a wall of the valve sleeve. The outer and inner surfaces 428, 430 define an annular wall 432 which is preferably radially spaced and circumscribed about the central axis A-A of passage 414 to form the body of the valve sleeve 400. Wall 432 has homogeneous material properties and includes flange portion 424 having a flange end face 419 where wall 432 axially extends to seat portion 426 and terminates at a distal second end portion with seat end face 422. The outer surface 428 along seat portion 426 of wall 432 is preferably configured to be insertable into existing valves. More specifically, seat portion 426 preferably includes lip portion 421 at the end of the valve sleeve to engage an interior groove within valve housing 12 to secure the valve sleeve in the sleeve recess of the housing 12. The lip portion 421 preferably includes a locking bead or ridge 423 disposed along the seat portion 426 which is preferably located at approximately the midpoint of the length L of valve sleeve 400 and more specifically at about 53% of length L measured from the flange end face 419. The ridge 423 defines a radial outermost portion of wall 432 along seat portion 426 and is configured for engaging a recess within housing 12 to support the valve sleeve 400 therein. The ridge 423 can be configured to prevent the sleeve 400 from falling out of the housing 12 when the valve 10 is not installed in the pipe assembly and can prevent slurry or other material buildup that may migrate between the valve sleeve and the housing.

Distal from ridge 423, lip portion 421 radially tapers toward the central axis A-A and has a first tapering portion 425 and a second tapering or angled portion 427. The first tapering portion 425 defines a first angle $\alpha$ relative to a line parallel to the central axis of the passageway 414 and the second tapering or angled portion 427 defines a second angle $\beta$ relative to an angle perpendicular to the central axis of passageway 414. Preferably, the first angle $\alpha$ is about five degrees (5°) to about fifteen degrees (15°) and is more preferably about ten degrees (10°. The second angle $\beta$ is preferably about fifteen degrees (15°) to about twenty-five degrees (25°) and is more preferably about twenty-one to twenty-three degrees (21°-23°).

The outer surface 428 defines a continuous transition with the inner surface 430 of wall 432 to further define lip portion 422. In particular, angled portion 427 is continuous with a first curved portion 434 which is preferably convex relative to passageway 414 to define a curved surface for engaging a corresponding portion of an opposing sleeve 400 when valve 10 is an open position or flow control gate 16 when valve 10 is in a closed position or in the process of closing. The convex curved portion 422 defines a radius of curvature ranging between about 0.15 inches to about 0.25 inches and more preferably is about 0.19 inches. Inner surface 430 includes a second curved portion 436 and a third curved portion 438 continuous in series with first curved surface 434 to define a groove 436' along the inner surface 430. The curved surfaces can be configured as concave or convex relative to the passageway 414 with a particular radius of curvature depending on the size of valve 10. For example, second curved surface 436 may be concave with a radius of curvature of about 0.130 inches and third curved surface 438 may be concave also with a radius of curvature of about 0.130 inches. The curved surfaces 436, 438 define the radial groove 436' along the inner surface 430 that acts as a spring for sleeve 400 when gate 16 is in a closed position or when gate 16 is in the process of closing. Radial groove 436' may have a radius of curvature, for example, of approximately 0.109 inches. As can been seen, redial groove 436' is larger as compared to the redial groove formed by curved surfaces 36' and 38' shown with respect to the embodiment of FIG. 5B and curved surfaces 36" and 38"shown in FIG. 6B. In particular, when gate 16 passes first curved surface 434, gate 16 applies forces against wall 432 and compresses wall 432 in directions x and y. The radial groove 436' provides a rebound or spring-like effect in sleeve 400. Moreover, in the absence of radial groove 436', the compressive forces applied by gate 16 would force wall 432 and curved surface 434 into the path of gate 16 toward direction x and/or in direction y against the respective half of housing 12 in which sleeve 400 is engaged. Thus, the radial groove 436' provides a cavity or space in which the portion of wall 432 compresses as gate 16 passes sleeve 400.

Similar to the embodiments disclosed with reference to FIGS. 5 and 6, a chamber 433 is located between the inner surface 428 and outer surface 430 of wall 432. Chamber 433 is located within the lip portion 421 of seat portion 426 and more preferably located distal of ridge 423. In addition, chamber 433 is radially closer to outer surface 428 than to inner surface 430. Where the dimension T is the radial distance between the outer surface 428 and the inner surface 430, the radial spacing between the chamber 433 and the outer surface 428 has been found to be about 11.5% of thickness T for all nominal sizes of valve sleeve 400. In addition, where the axial distance between flange end face 419 to the seat end face 422 is length L, the axial distance from flange end face 419 to about the center point of the cross-sectional area of chamber 433 is about 65% of the length L. Chamber 433 is continuous about the central axis A-A of the passageway 414 and defines a ring chamber having a substantially circular cross-section for housing a tubular ring shaped substrate or stiffening element. This stiffening element provides radial resistance to, for example, shearing forces exerted by gate 16 on the valve sleeve 400 as gate 16 travels between the open and closed positions. Although chamber 433 is described as having a substantially circular cross-section, other geometries may also be employed. FIG. 7 illustrates a stiffener ring 100 that may be housed within chamber 433. As described with reference to FIG. 7, stiffener ring 100 provides radial support for ridge 423 and prevents the pliable sleeve material from following gate 16 during its open and closing cycle. In addition, stiffener ring 100 can facilitate alignment of opposing sleeves 400 installed in valve housing 12.

Returning to FIG. 10B, the inner surface 430 and outer surface 428 of wall 432 initiate from flange end face 419. The flange end face 419 is preferably substantially perpendicular to the central axis A-A for engagement with the flange face of another piping element in the piping assembly. Flange face 419 defines an annular or ring shaped planar surface with an inner perimeter point defined by inner surface 430 and an outer perimeter defined by outer surface 428 being substantially circular and respectively defining an inner diameter ID and an outer diameter OD with a center point that is collinear with the central axis of the passageway 414. The inner surface 430 and outer surface 428 extend axially from the flange end face 419 to define the flange portion 424. The outer surface 428 along the flange portion 424 defines a first shelf 442 and a second shelf 424*a*. First shelf 442 defines a transition from the flange portion 424 to seat portion 426 in the unitary construction of the valve sleeve 400 and further defines an axial thickness of the flange portion 424 to engage a recess or other surface of the flange face within housing 12. Second shelf 424*a* defines a transition from first shelf 424 to flange face 419. A first o-ring 451*a* is positioned toward inner surface 430 circumferentially around sleeve 400 and a second o-ring is positioned toward outer surface 428 circumferentially around sleeve 400, where each of the o-rings provide a seal with housing 12. These o-rings replace the gasket portion 11' shown in FIG. 5B and can be configured to provide a seal when the valve is coupled to a piping system. These o-rings provide sealing effect with as little as 15 ft-lbs depending on size and the type of elastomeric material employed and 35-40 ft-lbs of torque at the flange bolt locations of a piping assembly.

To resist over-compression of flange portion 424 when valve 10 is coupled to a process pipe, chamber 446 houses a stiffening element enclosed within wall 432. In particular, chamber 446 is located proximate shelf 442 and extends axially to a point proximal the first shelf such that chamber 446 is located completely within flange portion 424 of sleeve 400. Chamber 446 is configured to house a ring shaped substrate having a generally rectangular cross-section similar to plate 200 shown in FIG. 8. As noted earlier, the plate acts as a stiffening element and provides axial support and/or resistance to the compressive force exerted by, for example, the flange bolts coupling the valve 10 to a process pipe assembly. Chamber 446 is continuous about the central axis of the passageway 414 to define a ring for housing the ring shaped stiffening element and/or a plurality of stiffening elements. Plate 200 is depicted in FIG. 8 with a plurality of voids 210, 212 configured to provide mechanical bond with sleeve 400 during the molding thereof. By way of example, a valve sleeve 400 configured for a nominal six inch valve, plate 200 would have an outer diameter of about eight inches, an inner diameter of about six inches, more preferably 6.3 inches and a uniform thickness of about 0.135 inches.

Referring again to FIG. 10B, wall 432 further defines at least one axially extending third chamber 452 disposed between the outer surface 428 and inner surface 430 and in communication with opening 450 (shown in FIG. 10C) at certain points around sleeve 400. The third chamber 452 is substantially cylindrical having a circular cross-sectional area along a central axis parallel to and radially spaced from the central axis A-A. The chamber 452 extends distally from the flange end face 419 and extends from the flange portion 424 into seat portion 426, terminating proximal of the seat end face 422. Where first chamber 433 and second chamber 446 continuously circumscribe the central axis A-A of the passageway 414, third chamber 452 communicates with the first chamber 433 and second chamber 446. Third chamber 452 is used during the molding process to position stiffening ring 100 within first chamber 433. In particular, third chamber 452 has an extension portion 452a that extends toward angled portion 427 to a point approximately at the central axis of first chamber 433. By comparison, third chamber 52' shown in FIG. 5B has an upper portion which extends beyond first chamber 433. The reduced dimension of extension portion 452a as shown in FIG. 10B provides a smaller chamber within which a plug, such as plug 60 shown in FIGS. 5C and 5D is positioned while still providing adequate positioning access for stiffening element housed in first chamber 433. A pin plug, similar to that shown in FIGS. 5C and 5D is positioned within chamber 452 after the stiffening ring has been molded within sleeve 400. Pin plug 60 provides additional support to the sleeve 400 and further minimize the presence or effect of any stress concentrations. However, because extension portion 452a of third chamber 452 is shorter than the corresponding portion of chamber 32' shown in FIG. 5B, the extension portion 63 of plug 60 would likewise be shorter for a plug positioned within third chamber 452. In addition, plug 60 is configured such that the extension portion 63 avoids intersecting first chamber 433 while still providing additional support within the third chamber 452. Otherwise, base end 61 and insertion end 62 of plug 60 shown in FIGS. 5C and 5D is substantially the same as a plug used for insertion in chamber 452.

Figure 10C:
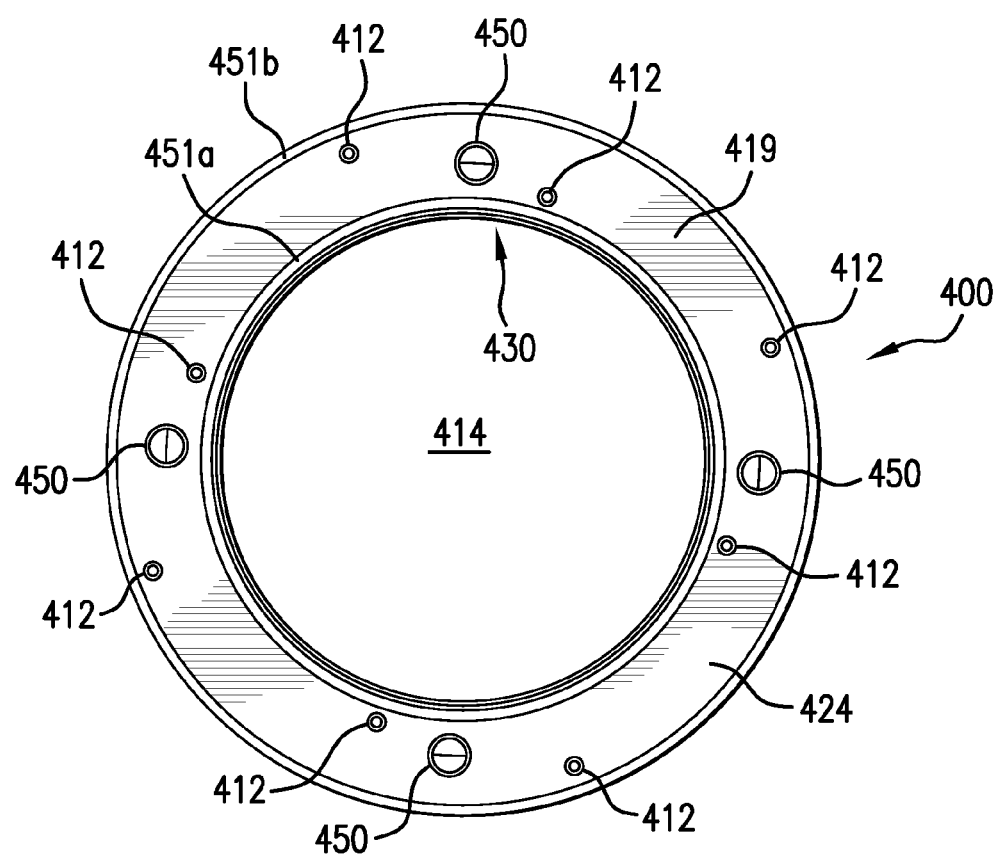
FIG. 10C is a back plan view of the valve sleeve in accordance with an embodiment of the present invention.

FIG. 10C is a back plan view of valve sleeve 400 showing flange portion 424 having one or more openings 450 spaced around sleeve 400. Each opening 450 is substantially circular and extends into cylindrical third chamber 452 to provide a means for locating the support ring housed in chamber 452 and to locate the support plate in chamber 446. A first o-ring 451a extends circumferentially around sleeve 400 and second o-ring 451b extends circumferentially around sleeve 400. Sleeve 400 further includes voids 412 spaced around sleeve 400 which are used to support the plate housed within chamber 446 during the molding process. The description of openings 450 and voids 412 are described above with reference to FIGS. 9, 9A and 9B and the associated detailed description. The pin plug 60 is provided for insertion into one or more of the chambers 452 via openings 450 to provide additional support to the sleeve 400 and further minimize the presence or effect of any stress concentrations. The pins 60 are preferably made of a rubber material and/or materials substantially similar to the wall 432 of sleeve 400. It has been found that plugs 60 made of plastic and like material are susceptible to cracking during valve operation thereby exposing the interior of sleeve 400 to process media. Moreover, the mold 300 shown in FIG. 9 to form the sleeve 20' is different from the mold used to form sleeve 400. In particular, the springs used in embodiment of FIG. 9 which allow for the axial displacement of the location pins relative to the remainder of the mold during the molding process are not used in this alternative embodiment.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A sleeve for sealing a gate valve, the sleeve comprising:
a body of unitary construction defining a flange portion configured to engage a valve housing and a sealing portion configured to engage a gate portion of said valve, said body having a generally circular shape defining an axially extending passage therethrough, said body having an inner wall and an outer wall;
a first curved surface of said inner wall extending around said sealing portion, said first curved surface configured to engage said gate portion of said valve;
a second curved surface of said inner wall contiguous with said first curved surface, said second curved surface extending around said inner wall, said second curved surface being concave relative to said body;
at least one support member encapsulated in the body between the inner surface and the outer surface, the support member having a surface radially extending in a direction from the inner surface to the outer surface so as to substantially support said sealing portion in an axial direction; and
a tapered lip portion disposed along said sealing portion, said tapered lip portion having first and second flat tapering portions, said first flat tapering portion configured to engage a body portion of said valve, said second flat tapering portion continuous with said first curved surface, said first flat tapering portion angled with respect to an axis of said axially extending passage.

2. The sleeve of claim 1 wherein said support member is housed within a chamber extending circumferentially within said body.

3. The sleeve of claim 2 wherein the support member is a first support member and the body includes a second support member spaced axially from the first support member.

4. The sleeve of claim 3 wherein said chamber is a first chamber, said second support member is housed within a second chamber extending circumferentially within said body, said second support member configured to support said flange portion.

5. The sleeve of claim 4 further comprising a third chamber extending from said second chamber to said first chamber.

6. The sleeve of claim 5 wherein said third chamber continuously circumscribes said passage within said sealing portion.

7. The sleeve of claim 5 wherein the flange portion includes at least one opening in communication with said third chamber in the body extending in the axial direction.

8. The sleeve of claim 4, further comprising a pin plug disposed in the second chamber.

9. The sleeve of claim 5, further comprising a pin plug disposed in the third chamber.

10. The sleeve of claim 1 wherein said body is formed from an elastomeric material.

11. The sleeve of claim 8 wherein said body and said pin are formed from an elastomeric material.

12. The sleeve of claim 1 wherein a radial groove is defined by said second curved surface, said radial groove configured to provide a spring-like force biased against said gate portion of said valve.

13. The sleeve of claim 1 wherein said first flat tapering portion defines a first angle relative to said axis and the second flat tapering portion defines a second angle relative to a line perpendicular to said axis.

14. The sleeve of claim 13, wherein the first angle is about 5 degrees to about 15 degrees.

15. The sleeve of claim 13, wherein the second angle is about 15 degrees to about 25 degrees.

16. The sleeve of claim 1, wherein the second flat tapering portion is free from contact with said body portion of said valve.

17. The sleeve of claim 3, wherein the first support member is a ring member having a substantially circular cross-section, and the second support member is a ring-shaped plate member having a generally rectangular cross-section.

18. The sleeve of claim 17, wherein the second support member is configured to provide axial resistance to compressive forces exerted by flange bolts coupling the gate valve to a process pipe assembly.

* * * * *